US010365825B2

(12) United States Patent
Burugula et al.

(10) Patent No.: US 10,365,825 B2
(45) Date of Patent: *Jul. 30, 2019

(54) INVALIDATION OF SHARED MEMORY IN A VIRTUAL ENVIRONMENT

(71) Applicant: International Business Machines Corporation, Armonk, NY (US)

(72) Inventors: Ramanjaneya S. Burugula, Yorktown Heights, NY (US); Niteesh K. Dubey, Yorktown Heights, NY (US); Joefon Jann, Ossining, NY (US); Pratap C. Pattnaik, Ossining, NY (US); Hao Yu, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/125,989

(22) Filed: Sep. 10, 2018

(65) Prior Publication Data

US 2019/0004707 A1    Jan. 3, 2019

Related U.S. Application Data

(63) Continuation of application No. 15/210,275, filed on Jul. 14, 2016.

(51) Int. Cl.
*G06F 3/06* (2006.01)
*G06F 9/455* (2018.01)
*G06F 12/1009* (2016.01)

(52) U.S. Cl.
CPC ........... *G06F 3/0605* (2013.01); *G06F 3/064* (2013.01); *G06F 3/0664* (2013.01);
(Continued)

(58) Field of Classification Search
CPC .......... G06F 12/1009; G06F 2212/151; G06F 2212/152; G06F 2212/163;
(Continued)

(56) References Cited

U.S. PATENT DOCUMENTS 5,117,350 A    5/1992    Parrish et al.
6,247,109 B1   6/2001    Kleinsorge et al.
(Continued)

FOREIGN PATENT DOCUMENTS

EP    2283429 B1      7/2015
GB    2331385 A       5/1999
WO    2013102532 A3   7/2013

OTHER PUBLICATIONS

Enoki, et al., "Memory-Efficient Index for Cache Invalidation Mechanism with OpenJPA", WISE 2012, LNCS 7651, pp. 696-703, 2012. © Springer-Verlag Berlin Heidelberg 2012.
(Continued)

*Primary Examiner* — Ann J Lo
*Assistant Examiner* — Jane Wei
(74) *Attorney, Agent, or Firm* — Robert J. Shatto (57) ABSTRACT

A server logical partition (LPAR) of a virtualized computer includes shared memory regions (SMRs). The SMRs include pages of the server LPAR memory to share with client LPARs. A hypervisor utilizes an export vector to associate logical pages of the server LPAR with SMRs. The hypervisor further utilizes a reference array to associate SMRs with client LPARs that have mapped at least one physical memory page of the SMR from a logical page of the client LPAR memory. In processing an operation to unmap one or more shared physical pages from one or more LPARs, the hypervisor uses the export vector and reference array to determine which LPARs have had a mapping to the physical pages.

17 Claims, 6 Drawing Sheets

(52) U.S. Cl.
CPC ........ *G06F 3/0673* (2013.01); *G06F 9/45558* (2013.01); *G06F 12/1009* (2013.01); *G06F 2009/45583* (2013.01); *G06F 2212/151* (2013.01); *G06F 2212/152* (2013.01); *G06F 2212/163* (2013.01); *G06F 2212/651* (2013.01); *G06F 2212/656* (2013.01)

(58) Field of Classification Search
CPC ......... G06F 2212/651; G06F 2212/656; G06F 3/0605; G06F 3/064; G06F 3/0644; G06F 3/0664; G06F 3/0665; G06F 3/0673
See application file for complete search history.

(56) References Cited

U.S. PATENT DOCUMENTS

| | | |
|---|---|---|
| 6,877,158 B1 | 4/2005 | Arndt |
| 7,089,377 B1 | 8/2006 | Chen |
| 7,111,145 B1 | 9/2006 | Chen et al. |
| 8,521,966 B2 | 8/2013 | Wibling et al. |
| 9,648,045 B2 | 5/2017 | Mooring et al. |
| 9,665,498 B2 | 5/2017 | Kiriansky |
| 9,697,053 B2 | 7/2017 | Jiang |
| 9,940,167 B2 | 4/2018 | Tsirkin et al. |
| 2008/0270680 A1* | 10/2008 | Chang .................... G11C 16/10 711/103 |
| 2009/0276200 A1 | 11/2009 | Beyer et al. |
| 2009/0307445 A1* | 12/2009 | Jacobs ................ G06F 11/0712 711/154 |
| 2009/0307538 A1 | 12/2009 | Hernandez et al. |
| 2010/0023941 A1 | 1/2010 | Iwamatsu et al. |
| 2011/0307663 A1 | 12/2011 | Kultursay et al. |
| 2012/0246388 A1 | 9/2012 | Hashimoto |
| 2013/0339953 A1 | 12/2013 | Wibling et al. |
| 2015/0026678 A1 | 1/2015 | Imada et al. |
| 2015/0205729 A1* | 7/2015 | Bates .................. G06F 12/1081 710/26 |
| 2018/0018098 A1 | 1/2018 | Burugula et al. |
| 2018/0018273 A1 | 1/2018 | Burugula et al. |

OTHER PUBLICATIONS

Diakhate, et al., "Efficient shared memory message passing for inter-VM communications", HAL archives-ouvertes, Mar. 17, 2009. 11 pages.

Van Hensbergen, "P.R.O.S.E.: Partitioned Reliable Operating System Environment", IBM Research Report, RC23694 (W0508-91) Aug. 16, 2005. 5 pages.

List of IBM Patents for Patent Applications Treated as related, Sep. 7, 2018, 2 pages.

Burugula, et al., "Shared Memory in a Virtual Environment," U.S. Appl. No. 16/240,857, filed Jan. 7, 2019.

List of IBM Patents or Patent Applications Treated as Related, Jan. 7, 2019, 2 pgs.

* cited by examiner

INVALIDATION OF SHARED MEMORY IN A VIRTUAL ENVIRONMENT

BACKGROUND

The present disclosure relates to virtualized server environments, and more specifically, to managing memory pages included in a shared memory region of a server logical partition or virtual machine.

SUMMARY

According to embodiments of the present disclosure, a method for managing a shared memory region (SMR) included in a computer. The method includes receiving a shared page request associated with a physical page of a physical memory block included in the computer. The physical page is included in a shared memory region (SMR) of a first logical partition (LPAR) among a plurality of LPARs of the computer. The physical page corresponds to a logical page included in a logical memory block (LMB) of the first LPAR.

In response to the request, the method determines a shared access state associated with the first LMB. The determination is based on the correspondence of the physical page to the first logical page and the first logical page being included in the first LMB, and the shared access state indicates that the SMR is associated with the first LMB.

The method also includes receiving a second shared page request associated with access to the physical page by a second LPAR included in the plurality of LPARs. In response to the second shared page request, the method determines a mapping state associated with the SMR. The mapping state indicates that the second LPAR has established a mapping to the physical page.

The method further includes receiving a mapping request associated with the physical page. In response to the mapping request the method determines that the second LPAR has established a mapping to the physical page and invalidating the mapping. The determination is based at least in part on the shared access state associated with the first LMB and the mapping state associated with the SMR.

According to the disclosure, determining that the second LPAR that has established a mapping to the physical page can comprise determining that the first logical page is included in the first LMB and, based on the shared access state associated with the first LMB that the first LMB is associated with the SMR. Based on the mapping state associated with the SMR, the method can further determine that the second LPAR has established a mapping to the physical page.

In some embodiments, the shared access state comprises an export vector corresponding to the first LMB. The export vector comprises a bit corresponding to each SMR in a set of SMRs included in the computer, and a logic value of each bit in the export vector represents that the corresponding SMR is associated with the first LMB. Also, in some embodiments, the mapping state comprises a reference array. The reference array has an entry representing each SMR in a set of SMRs included in the computer. Each SMR entry comprises an LPAR bit vector comprising a set of bits in which each bit in the LPAR bit vector corresponds to each LPAR in the plurality of LPARs. A logic value of each bit represents that the corresponding LPAR has established a mapping to at least one physical page included in the SMR.

A computer program product having instructions executable by a processor to perform methods of the disclosure can embody the disclosure. A system comprising a computer, a plurality of LPARs, an SMR, a processor, and a hypervisor program can embody the disclosure.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure (hereinafter, "the disclosure") relate to virtualized computer environments having a plurality of logical partitions (LPARs). More particular aspects relate to applications executing in an operating system of one logical partition sharing memory pages of an application executing in an operating system of another logical partition. While the present disclosure is not necessarily limited to such uses, aspects of the disclosure may be appreciated through a discussion of various examples using this context.

A computer in a computing system can include virtualized instances of physical resources of the computer. A computer can virtualize resources such as physical processors, physical blocks of memory, I/O devices or network interfaces, and/or storage media or devices, for example. As used herein, "computer" refers to any form of computing device capable of virtualizing physical resources, for example: server computers, desktop or laptop computers, and mobile devices (e.g., a tablet or mobile phone).

Virtualizing physical resources of a computer is one means by which a computer can "partition" the physical resources of the computer to allocate, or share, portions of the physical resources among a plurality of "partitions" of the computer. As used herein, a "partition" comprises a self-contained computing environment that contains at least one processor and, optionally, memory resources sufficient to enable programs to execute within that environment independently of programs operating in other partitions of the same computer. Correspondingly, "logical partition (LPAR)" is used herein to refer to a partition of a computer that includes at least some virtualized resources of the computer.

LPARs, and other forms of logical partitions, are also in some embodiments called "virtual machines (VMs)", and it will be understood by one of ordinary skill in the art that a VM having at least some virtual resources, and an LPAR, are interchangeable within the scope of the disclosure. For purposes of illustrating the disclosure, but not limiting to embodiments, reference to an "LPAR" is further understood herein to refer inclusively to an OS, or other program, operating within the LPAR.

An LPAR is not limited to only virtual resources, and can include any combination of virtual and/or physical resources. For example, an LPAR can include only physical processors, only virtual processors, or a combination of some physical and some virtual processors. An LPAR can include only virtual memory (e.g., one or more virtual memory pages), only physical memory (e.g., one or more pages within a physical memory), or a combination of some physical and some virtual memory resources. An LPAR can have other forms of virtual resources in addition to virtual processors and/or memory, including virtual network interfaces and/or virtual storage (e.g., virtual hard drives). A "virtualized computer", as used herein, refers to a computer in which physical resources of the computer are virtualized, or partitioned, and allocated to one or more LPARs (or, VMs) operating in the computer.

In a computer, physical processors can be embodied as processor modules, processor modules can contain one or more processor cores, and processor cores can include a plurality of processor threads (e.g., threads of a multi-threaded processor core). A processor thread can be an execution unit within a processor core and can be wholly, or partially, independent of other threads within that core (or, other cores within the same or other processor modules). A computer can virtualize a physical processor as, for example, a time-sliced fraction of a physical processor (e.g., core or thread), a subset of physical cores of one or more physical processor modules, and/or a subset of threads of one or more physical processor cores or modules. As used herein, "processor" refers to any of the various forms of implementing a physical or virtual processor in a computer.

Processors can execute instructions from and/or read or write data in a memory of a computer. A computer can include a single memory, or can include a plurality of memories and each memory can have a different function, or role, within the computer. For example, one memory can be a main memory, and other memories can be cache memories, such as L1, L2, or L3 caches. Memories can be implemented using various electronic technologies, including, for example, semiconductor Dynamic Random Access Memory (DRAM) or flash memories.

A physical memory of a computer can be embodied as one or more physical memory modules, a memory can be organized as physical memory blocks (PMBs), and the PMBs can be comprised of physical memory pages. A PMB can be a portion of a memory module or, alternatively, can span a plurality of memory modules, according to the relative sizes of memory modules and PMB. A memory module and/or a PMB can each have a size, for example, that is a power of 2, such as 4 GB, 256 GB, or 1 TB, and the sizes of PMBs can be different from each other and from that of a memory module. In embodiments of the disclosure (hereinafter, "embodiments"), pages comprising a PMB can be, for example, a power of 2 size, such as 4K, 16K, and/or 64K bytes.

A computer can virtualize physical memory by mapping a "logical" memory block (LMB) to one or more PMBs or, alternatively, to a sub-portion of a PMB (e.g., a particular set of contiguous pages of a PMB). It can be convenient, in an embodiment, to associate an LMB of a particular size to a corresponding contiguous region of a PMB having the same size. However, an embodiment can associate any particular set of pages of one or more PMBs with any particular LMB, and need not necessarily form an LMB of contiguous pages of any one PMB, or contiguous PMBs.

An LMB can be comprised of logical pages, and an embodiment can have a size of a logical page, within an LMB, that is identically the size of a page in a PMB. Alternatively, an embodiment can have a logical page size larger than the size of a physical page. For example, an embodiment can have a logical page size of 64 KB which in turn can map, for example, to 16 contiguous 4 KB pages within the portion of the PMB mapped by the LMB. Logical pages within an LMB can have a logical address (or, "Logical Page Number," LPN) corresponding, or "mapped", to the physical address (or, "Physical Page Number," PPN) of a page of a PMB.

Figure 1:
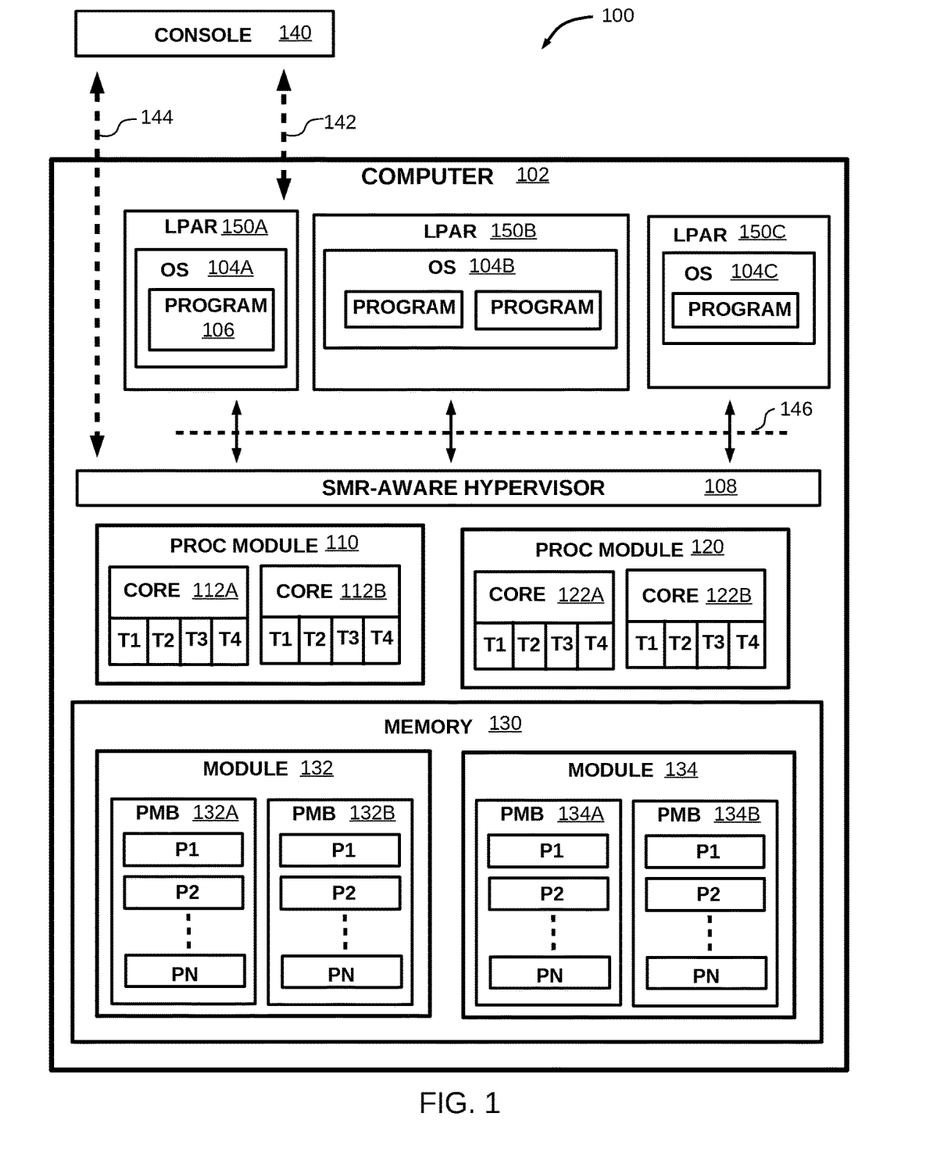
FIG. 1 is a block diagram illustrating an example computer, according to aspects of the disclosure.

FIG. 1 depicts an example computer system, 100, according to embodiments of the disclosure. Computer 102 can be a virtualized computer and includes processor modules 110 and 120, each of which contains a plurality of processor cores, such as 112A, 112B, 122A and 122B. Each of the processor cores in turn have processor threads, such as threads T1-T4 in each of processor cores 112A, 112B, 122A and 122B. Computer 102 includes memory 130, which is comprised of memory modules 132 and 134, which in turn are organized as PMBs, such as 132A and 132B. The PMBs can be further organized as pages (e.g., P1 through PN). For example, PMB 132A can be a 256 GB block of memory organized as contiguous 4 KB physical pages.

A virtualized computer can include a plurality of LPARs, and the LPARs can include programs, such as operating systems (OSes), that can further include other programs. To illustrate, computer 102 is virtualized to include LPARs 150A-150C, which in turn include OSes 104A-104C, respectively. The OSes further include programs, such as program 106 of OS 104A.

While not shown in FIG. 1, a computer can also include I/O devices and/or interfaces, such as storage devices (e.g., disk or flash drives), network interfaces, input devices such as a mouse or keyboard, and/or output devices such as displays or printers, or interfaces to these devices, for example. A computer, or a component thereof (e.g., a physical processor module, or an Application Specific Integrated Circuit, or "ASIC"), can interconnect processors, memory, and I/O devices or buses by means of I/O buses or links, such as, for example, PCI-Express, SATA or SAS, Fibre Channel, and Ethernet. For example, while not shown in FIG. 1, computer 102 can have a variety of such I/O devices and the I/O devices can be connected to the processors and/or memory of computer 102 by means of I/O buses or links. A virtualized embodiment of computer 102 can include virtualized processors, virtualized memory, and/or virtualized I/O devices and/or virtualized storage.

Partitioning and virtualizing physical resources can isolate the physical resources corresponding to virtual resources allocated to one LPAR from those corresponding to virtual resources allocated to another LPAR. For example, a virtual processor can correspond to particular threads of core 112A and an LMB can correspond to PMB 134A (or, a portion thereof) and LPAR 150A can be assigned, or "allocated", the virtual processor and the LMB for its exclusive use. The computer can restrict other LPARs, such as 150B and 150C, from access to the physical processor threads of core 112A, and physical memory pages of PMB 134A, corresponding to the virtual processor and LMB allocated to LPAR 150A.

A virtualized computer can include a virtualization component, which can operate to create the virtual instances of the resources, and to allocate those virtual resources (e.g., virtual processors and/or virtual memory) to LPARs, or otherwise manage those virtual resources (e.g., modify their size or correspondence to particular physical resources). In an embodiment, a "hypervisor" can be a component of a virtualized computer that creates and/or manages the virtual resources. As illustrated in FIG. 1, computer 102 includes a hypervisor, SMR-aware hypervisor 108, which can virtualize resources such as processors in processor modules 110 and 120, or PMBs in memory modules 132 and 134. An "SMR-aware" hypervisor can embody features and/or aspects of the present disclosure, such as are described in reference to FIGS. 3A, 3B, 4, and 5. "Hypervisor", as used hereinafter, refers to any form of a hypervisor that is SMR-aware so as to embody one or more features and/or aspects of the disclosure.

A hypervisor can be a "built-in" component of a virtualized computer, such as firmware included in the computer and operating in modes of the computer having particular privileges (e.g., access to privileged processor instructions) compared to other programs of the computer (e.g., programs operating within an LPAR). In other embodiments, a hypervisor can be a program of an LPAR (e.g., an operating system), in which that LPAR has particular privileged operating modes (e.g., access to privileged processor instructions) compared to other LPARs.

As used herein, for purposes of illustrating the disclosure, but not limiting to embodiments, a "hypervisor" refers to any embodiment of a virtualization component of a virtualized computer, or in communication with a virtualized computer, that operates to partition, or otherwise virtualize, the physical resources of the computer, and/or to manage allocation or use of the virtual and/or physical resources of the computer by LPARs.

A hypervisor can virtualize physical processors of a computer. Hypervisor 108, for example, can create virtual processors corresponding to the processor cores, threads, or fractions thereof, of processor modules 110 and/or 120, and allocate particular virtual processors to each of the LPARs 150A-150C. Hypervisor 108 can restrict the LPARs to use only the particular physical processors corresponding to the virtual processors allocated to each LPAR. Similarly, a hypervisor can partition the physical memory of the computer, such as by creating LMBs mapped to particular portions (or, pages) of PMBs. The hypervisor can allocate one or more particular LMBs to each LPAR. Hypervisor 108 can restrict the LPARs to use only the particular physical memory pages corresponding to particular logical pages of the LMBs allocated to each LPAR. Each of the LPARs can be unaware of the presence of the other LPARs or the physical processors and/or memory comprising the computer or allocated to other LPARs.

A hypervisor can interact with a management component of a virtualized computer to configure the LPARs and physical or virtual resources of the computer. For example, a management component, or "management console", can provide a graphical user interface (GUI) suitable for a human to interact with the computer. A management console can provide a command line interface (CLI) suitable for a program to interact with the computer. A management console GUI and/or CLI can include, for example, interfaces to determine how many LPARs to create, which resources to partition or virtualize and in what fractions, which virtual and/or physical resources to allocate to each LPAR, and/or when to activate (or, "boot") or terminate particular LPARs.

As used herein, "management console" refers to any component of a computer that participates in determining the configuration and/or management of virtual or physical resources and LPARs of a virtualized computer. A management console can be a component included in a virtualized computer; for example, a management console can be a component of, or can be, a service element of a virtualized computer. A management console can be a component of another computer or in communication with a virtualized computer (e.g., by means of a network connection to another computer).

Computer system 100 includes management console 140. Computer 102, or components thereof, can communicate with management console 140 by means of interfaces 142 and/or 144. Management console 140 can be a source of inputs to computer 102, and/or can be a consumer of outputs, or of results of operations of computer 102, or components thereof. Management console 140 can be a utility to manage, or administer, resources and/or operations of a computer, and/or components thereof. For example, a human user (e.g., using a GUI), or a program (e.g., using a CLI), can use management console 140 to determine the number of LPARs included in computer 102 and, optionally, the type of OSes included in each of the LPARs.

Management console 140 can be used to assign particular resources of computer 102 to LPARs included in computer 102, and/or to boot or shutdown particular LPAR, for example. Management console 140 can interact with hypervisor 108 as part of administering resources and/or operations of computer 102. Management console 140 can communicate with hypervisor 108 by means of, for example, interface 144. Management console 140 can communicate (e.g., by means of interface 142) with one or more of LPARs 150A-150C (referred to herein, collectively, as "LPARs 150"), and/or OSes 104A-104C 104C (referred to herein, collectively, as "OSes 104").

Interfaces between a console and a computer can be particular to whether a console is a component of the computer, or is embodied (e.g., in another computer) external to the computer. For example, if management console 140 is embodied external to computer 102, interfaces 142 and/or 144 can be network interfaces, or I/O device interfaces. Embodiments can implement interfaces 142 and 144 as different types of interfaces. For example, interface 142 can be an Ethernet interface between management console 140 and OS 104A and/or program 106, and interface 144 can be a different type of interface, such as an I/O bus or I/O link.

Management console 140 can be a component of computer 102 and interfaces 142 and/or 144 can be interfaces internal to computer 102. For example, interface 144 can be a messaging interface using a mailbox in a region of a memory (e.g., within memory 130) that can be shared by management console 140 and hypervisor 108. Interface 144 can include program function calls from management console 140 to hypervisor 108, and/or vice versa. Interface 144 can include interrupts signaled to console 140 and/or hypervisor 108, and/or can include data structures in a region of a memory (e.g., within memory 130) that can be shared by console 140 and hypervisor 108.

LPARs in a virtualized computer can communicate with a hypervisor by means of a "hypervisor interface", such as hypervisor interface 146 in computer 102 between LPARs 150 and hypervisor 108. A hypervisor interface in a virtualized computer system can be any of a variety of interfaces suitable for an LPAR to communicate with a hypervisor. For example, interface 146 can be a set of program function calls from the LPARs 150 to hypervisor 108, messages exchanged between hypervisor 108 and LPARs 150, communication interfaces such as physical or virtual Ethernet connections between LPARs 150 and hypervisor 108, interrupts signaled to hypervisor 108 and/or to LPARs 150, and/or can include data structures in a memory (e.g., within memory 130) that can be shared by hypervisor 108 and LPARs 150. A hypervisor interface, such as 146, can be a combination of any of the foregoing.

Figure 2A:
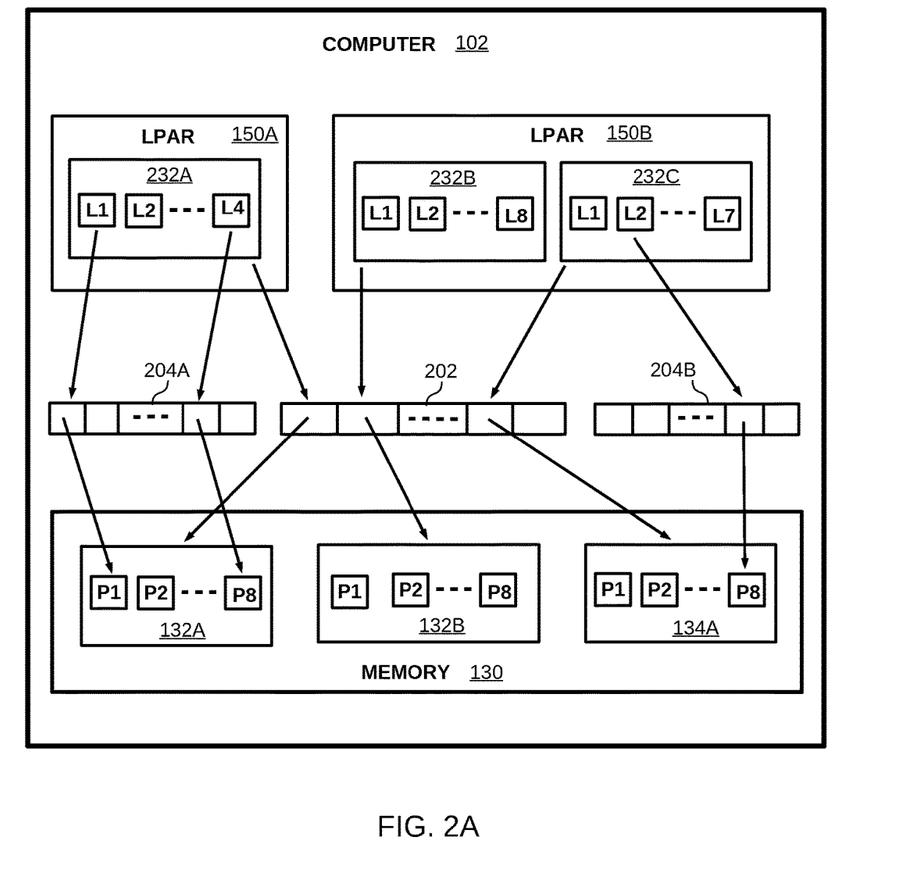
FIG. 2A is a block diagram illustrating an example mapping of logical to physical pages, according to aspects of the disclosure.

FIG. 2A illustrates an example of mapping logical pages of LMBs to physical pages of PMBs. For purposes of illustration, but not limiting to embodiments, FIG. 2A is described using the example virtualized computer 102 of FIG. 1. In embodiments, a hypervisor can form LMBs. For example, hypervisor 108 can form LMBs 232A-232C comprised of logical pages (e.g., logical pages L1-L4 of LMB 232A). A hypervisor can allocate particular LMBs to particular LPARs. For example, in FIG. 2A, LMB 232A is allocated to LPAR 150A and LMBs 232B and 232C are allocated to LPAR 150B.

A hypervisor can associate LMBs with particular PMBs in a memory of a computer. For example, hypervisor 108 can associate LMB 232A with PMB 132A, LMB 232B with PMB 132B, and LMB 232C with PMB 134A. A hypervisor can use an LMB table, for example, to associate a particular LMB with a particular PMB (or, pages of the PMB). In FIG. 2A hypervisor 108 can use LMB table 202 to "map" (i.e., make the association between) the LMBs to the PMBs. An LMB can have, for example, an LMB ID and a PMB can have, for example, a PMB ID. An LMB ID can select an entry in LMB table 202 and the entry can contain a corresponding PMB ID. In some embodiments, an LMB can be mapped to pages in each of more than one PMB, and an LMB table can include, for example, a list of PMBs, and a list of the pages included in each PMB, that maps the LMB to the PMBs, or pages thereof.

Logical pages within an LMB can be similarly mapped to physical pages in a corresponding PMB. In embodiments, a logical page can be associated with a physical page by means of, for example, a page table. For example, in FIG. 2A, page table 204A maps logical pages of LMB 232A to physical pages of PMB 132A, and page table 204B maps logical pages of LMBs 232B and 232C to physical pages of PMBs 132B and 134A. In a more specific example, page table 204A has an entry corresponding to a LPN of logical page L1 of LMB 232A, and the content of that entry can be the PPN of physical page P1 of PMB 132A. Page table 204A can operate similarly for various, or all, logical pages of one or more LMBs allocated to LPAR 150A. Page table 204B can operate similarly for various, or all, logical pages of one or more LMBs allocated to LPAR 150B.

While the example associations between LMBs and PMBs, and between corresponding logical and physical pages, illustrated in FIG. 2A are described as by means of mapping tables, the description is not intended to be limiting to embodiments. It would be apparent to one of ordinary skill in the art that other structures can accomplish such associations, such as lists or hardware elements (e.g., registers) within the scope of the disclosure. Further, while the example of FIG. 2A illustrates a page table associated with each LPAR, it will be understood by one of ordinary skill in the art that an embodiment can employ, for example, a single table that maps the logical addresses of all LMBs, for all LPARs collectively, or a combination of other tables or structures that can associate a logical page of an LMB allocated to one LPAR with a physical page in the memory of the computer.

In embodiments, program instructions executed by a processor can reference data (e.g., a byte or contiguous sequence of bytes) in a memory using a logical address (LA) of the data in a memory of the computer. In some embodiments, an LA can be a logical address of that data (e.g., a data byte or word) within a logical page of an LMB. In alternative embodiments, an LA referenced by a program instruction can be a virtual address (VA) of the data. For example, an OS can create a virtual address space to allocate to, or associate with, a program (or, programs) and the OS can map (e.g., by means of a mapping table within the OS) the virtual address space to logical pages within an LMB (or, alternatively, to pages within a PMB). A VA can correspond to a LA within a logical page of an LMB, for example. In some embodiments, a VA can differ from a corresponding logical address in a logical page of an LMB. As used herein, "LA" refers to any form of virtual or logical address of data in a memory that can be mapped to a corresponding PA (e.g., by means of a page table).

An LA can correspond to a physical address (PA) of the data as the data is stored in a physical page of a memory of a computer (e.g., a physical page in a PMB). In some embodiments, mapping tables 204A and 204B can be a "hardware page table (HPT)" and a hardware element of the computer can use the HPT to determine a PA corresponding to an LA of data in a memory. For example, a processor (or, a memory control or management unit, or other unit designed to translate logical to physical addresses) can access an HPT to translate a virtual address (VA) referenced in an instruction to the corresponding physical address (PA) in the physical memory of the computer. For purposes of illustrating the disclosure, but not limiting to embodiments, hereinafter page tables 204A and 204B are considered to be HPTs used by a processor (or other hardware element) of computer 102 to translate an LA of data referenced by the processor to a PA of a physical page of computer 102 memory 130.

In some embodiments, logical pages and corresponding physical pages are of a uniform size, such as (for example) 4 KB or 16 KB. An LA can correspond to a location (e.g., a particular byte or word offset) within a logical page, and the logical page can have a corresponding "logical page number (LPN)" within a set of logical pages (e.g., an LMB, or all LMBs collectively). For example, LPN "0" can be the lowest ordinal logical page in a set of contiguous pages, and increasing LPNs can correspond to successive logical pages within the set. Similarly, a PA can correspond to a location (e.g., a particular byte or word offset) within a physical page, and the physical page can have a corresponding "physical page number (PPN)" within a set of physical pages (e.g., a PMB, or all PMBs collectively). For example, PPN "0" can be the lowest ordinal physical page in a set of contiguous physical pages, and increasing PPNs can correspond to successive physical pages.

A page table can have entries corresponding to LPNs, and the content of each of the entries can be a PPN to which a corresponding LPN is mapped. For example, an HPT may contain LPN entries for each logical page of one or more LMBs allocated to an LPAR (or, all LMBs of a computer collectively). An LPN can select an entry in the table and the corresponding PPN can be extracted from that entry to translate an LA to a PA, for example.

In embodiments, a hypervisor can manage tables to map LMBs to PMBs (e.g., LMB table 202), and/or to map logical pages to physical pages (e.g., page tables 204A and/or 204B). A hypervisor, and/or hardware elements of a computer, can restrict access to the tables to only the hypervisor, and other programs (e.g., programs executing in an LPAR) can be prevented or prohibited from accessing the tables (or, other structures that associate logical memory blocks or pages with physical memory blocks or pages). Using the example of computer 102 of FIG. 1, hypervisor 108 can manage HPTs 204A and 204B.

A hypervisor can associate LMBs with PMBs, or portions thereof, at the time an LMB is allocated to an LPAR, at the time an LPAR is started (e.g., booted), and/or a time a program executing in an LPAR makes reference to a page (or to the LA of some data) within an LMB. A hypervisor can enter a PMB ID (for example), corresponding to a particular LMB or LMB ID, into an LMB table at the time the hypervisor creates the LMB, when allocating an LMB to an LPAR, or in response to a first reference by an LPAR to a logical page within an LMB.

A program, such as an OS, executing in an LPAR can request a hypervisor to map a logical page to a physical page, and the program can make the request at a time it attempts to first reference data within that logical page. For example, a processor executing in a computer can execute an instruction that references a particular LA, and the LA may be within a logical page that is not presently mapped by a page table to a physical page. The processor can generate a "page fault" exception, or interrupt, resulting from an instruction reference to an address that is not mapped to a physical page. A page fault exception or interrupt can invoke a "page fault handler" (e.g., a page fault handler program or function of an OS) within an LPAR to establish a translation from the LA to the PA of a physical page to enable the processor to resume execution using memory of that physical page.

In some embodiments, an LPAR (e.g., an OS within the LPAR) can establish a translation from an LA to a PA by invoking the hypervisor (e.g., by means of a program function call). A hypervisor can determine a physical page to map to the logical page, and the hypervisor can enter the physical page (e.g., the PPN of the page) into an HPT (e.g., an entry corresponding to the LPN of the logical page) that a processor (for example) accesses to translate LAs to PAs. For example, an LPAR can call hypervisor 108, by means of a hypervisor function call of interface 146 (e.g., "hpt enterpage"), to enter a logical page address translation into an HPT associated with that LPAR, such as HPT 204. In another function call of a hypervisor interface (e.g., a different hypervisor call, or different form of an "hpt enter page" function call), an LPAR can signal to the hypervisor to invalidate, or remove, a particular LA translation in an HPT.

In embodiments, an LPAR and/or a hypervisor can identify an LMB by an LMB ID. An LMB ID can itself be an address, such as the address of the first byte, or logical page, of the LMB relative to all LMBs created by a hypervisor. An LA, or a logical page corresponding to an LA, can operate to identify an LMB (e.g., by implication from its logical address). In alternative embodiments, an LMB ID can be some other identifier that uniquely identifies a particular LMB. In requesting a hypervisor to establish a translation from an LA to a PA in an HPT, an LPAR can, for example, provide one or more of the LA, the LPN of a logical page, or an LMB ID to the hypervisor in a hypervisor call.

The hypervisor can use the LA, LPN, and/or LMB ID to identify the LMB and associate the LMB with a corresponding PMB, and/or to associate the LPN with a corresponding PPN. In some embodiments, as part of establishing the translation, the hypervisor may determine that the LMB is not presently mapped to any PMB and may select a PMB to map from the LMB. Similarly, as part of establishing the translation, the hypervisor may determine that the logical page is not presently mapped to any physical page of a PMB and may select a physical page to map from the logical page.

In a virtualized computer, it can be advantageous for two or more LPARs to share the same physical page of the computer. For example, one LPAR in the computer can be a "server" LPAR and can make physical pages mapped from its LMBs accessible to one or more other, "client" LPARs. For purposes of the disclosure, "server LPAR" refers herein to an LPAR making physical pages allocated to it available for sharing with one or more other LPARs, and "client LPAR" refers herein to an LPAR sharing the server LPAR page(s).

Figure 2B:
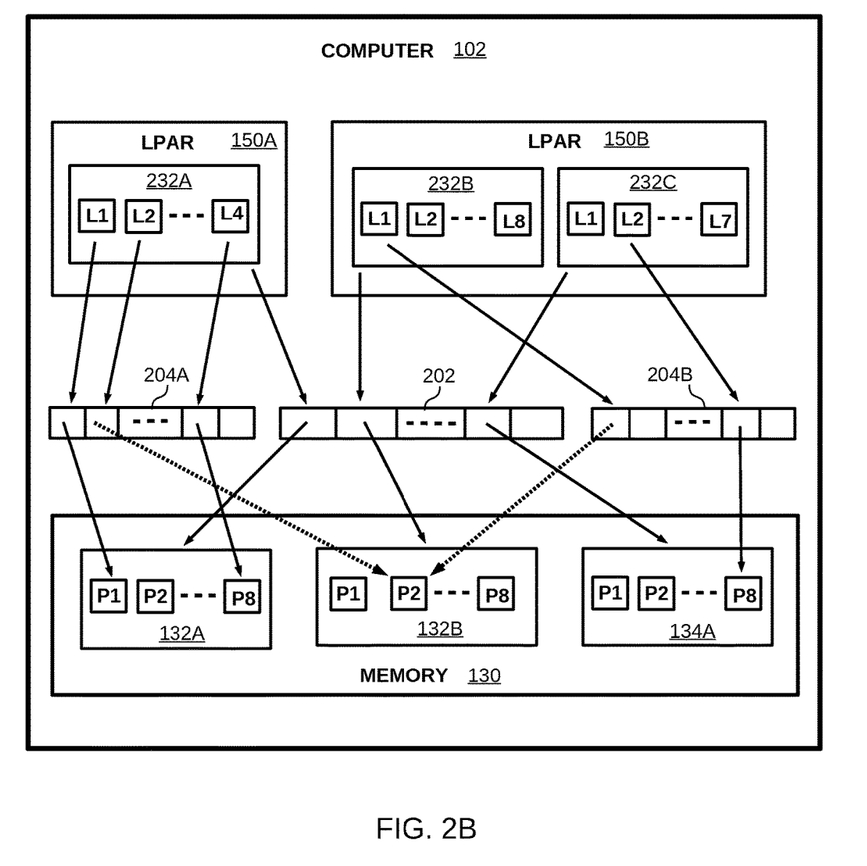
FIG. 2B is a block diagram illustrating an example mapping of logical to shared physical pages, according to aspects of the disclosure.

FIG. 2B illustrates an example of two LPARs sharing a common physical page. For purposes of illustration, but not limiting to embodiments, FIG. 2B continues the example of virtualized computer 102 of FIG. 1 and the LMB and page tables (HPTs) described in reference to FIG. 2A. FIG. 2B illustrates the mapping of virtual pages to physical pages shown in FIG. 2A, with the addition of two LPARs mapping a "shared" physical page in computer 102 memory 130. LMB 232A is allocated to LPAR 150A and contains a logical page L2 mapped through HPT 204A to physical page P2 of PMB 132B. For example, the LPN of LMB 232A logical page L2 can index HPT 204A and the indexed entry can contain the PPN of PMB 132B physical page P2.

The dashed arrow from the HPT 204A LPN entry (containing the PPN of PMB 132B physical page P2) indicates that LPAR 150A can be a server LPAR that has made physical page P2 of PMB 132A shareable by other LPARs. Accordingly, LPAR 150B can be a client LPAR that also maps PMB 132B physical page P2 to share the contents of that page with LPAR 150A (and, any additional LPARs, not shown, that may also map PMB 132B physical page P2). In FIG. 2A, LMB 232B is allocated to LPAR 150B, and logical page L1 of LMB 232B is mapped through HPT 204B to PMB 132B physical page P2 to enable LPAR 150B to share that physical page with LPAR 150A. Here again, the dashed arrow from the HPT 204B LPN entry (containing the PPN of PMB 132B physical page P2) indicates that PMB 132B physical page P2 is a shared physical page.

While the examples of FIG. 2A and FIG. 2B illustrate only 2 LPARs mapping virtual to physical addresses, it would be apparent to one of ordinary skill in the art that the scope of the disclosure is not limited to only two LPARs mapping virtual addresses to physical addresses in this manner, or to sharing the same physical page in a virtualized computer memory. It would be further apparent to one of ordinary skill in the art that the scope of the disclosure is not limited to LPARs sharing only a single physical page in a virtualized computer memory.

In embodiments, a server LPAR can make a particular physical page (or, set of pages) available to client LPARs to share the physical page(s), or the content thereof. The terms "server LPAR" and "client LPAR" can have many connotations, according to the type of service a server LPAR offers to client LPARs. As used herein, "server LPAR" refers to an LPAR that makes one or more physical pages allocated to it (e.g., mapped from a logical page of a server LPAR LMB) available to other LPARs to share. Correspondingly, as used herein, "client LPAR" refers to an LPAR that is authorized (e.g., by the server LPAR, or by a hypervisor) to access one or more physical pages of a server LPAR.

A "shared memory region (SMR)", as used herein, refers to a particular set of related physical pages that are made available by a server LPAR to share with client LPARs. Physical pages comprising an SMR can be related as part of a particular data structure or file, and can be, for example, contiguous physical pages within, or spanning, particular PMBs. Physical pages comprising an SMR can be pages that are non-contiguous, and can be within the same PMB or can be in different PMBs. A hypervisor can interact with LPARs to create and manage an SMR, and the hypervisor can use any of a variety of data structures to associate physical pages with one or more SMRs.

A virtualized computer can limit support for SMRs to a particular maximum number of SMRs. The maximum number can be based on, for example, a maximum number of SMRs that any one server LPAR is permitted to create, combined with a maximum number of LPARs that can act as shared page server LPARs in the computer. For example, a design limitation, or policy, of a virtualized computer may permit a server LPAR to create a maximum of 256 SMRs, and another design limitation, or policy, of a virtualized computer may permit a maximum of 64 LPARs to act as server LPARs, resulting in a limit of 16K SMRs that can be defined within the computer.

To access physical page(s) within an SMR, a client LPAR can establish a mapping from a logical page of an LMB, allocated to that client LPAR, to a shared page of an SMR. In embodiments, an LPAR can use a hypervisor interface (e.g., interface 146 of FIG. 1) to request the hypervisor to allocate a physical page to the LPAR, corresponding to the logical page, and/or to enter the PPN of that physical page into an HPT that maps logical page LPNs to physical page PPNs. Accordingly, a client LPAR can use a hypervisor interface to request the hypervisor to create a mapping from a logical page of a client LPAR LMB to a shared page of an SMR. For example, a hypervisor interface can include a function call to request the hypervisor to enter the PPN of a shared page of an SMR into a page table that maps LPNs of one or more LMBs allocated to the client LPAR to PPNs.

Some operations of a virtualized computer can require ending sharing of one or more physical pages of an SMR. Examples of such operations include a server LPAR making particular shared pages, or the SMR as a whole, no longer shared (with particular client LPARs, or possibly all client LPARs), or termination of a server LPAR while client LPARs are operating (and, may have active mappings to a shared page). In another example, a hypervisor can "reclaim" physical pages, or a PMB, such as to allocate those physical pages to one or more other LPARs. The reclaimed physical pages, or PMBs, can include shared pages of an SMR.

To end sharing of physical pages within an SMR, client LPARs or, optionally, a hypervisor, can invalidate mappings from client LPAR logical pages to the shared physical pages (possibly re-mapping those logical pages to other physical pages in the same or other PMBs). Invalidating a mapping to a shared physical page can insure against an LPAR successfully referencing, or access data within, a previously shared physical page. Invalidating a mapping can be, for example, changing the PPN entry of a page table to a value indicating that the corresponding logical page LPN is not mapped to any physical page.

In embodiments, a hypervisor can initiate the client LPARs invalidating mappings to shared physical pages. The hypervisor can initiate the invalidation in response to a request from a server LPAR, or in response to an operation (such as the foregoing examples) that requires ending sharing of the shared pages. To initiate the client LPARs invalidating the mappings or, alternatively, for a hypervisor to perform the invalidating, the hypervisor determines which LPARs have active mappings to the shared physical pages. To make that determination, a hypervisor can exhaustively search each page table to determine if that page table includes PPNs (for example) of shared physical pages. However, in a large system having large memories, and/or a large number of LPARs (particularly, if each LPAR has a unique or dedicated page table), such an exhaustive search can be inefficient and time consuming.

Figure 3A:
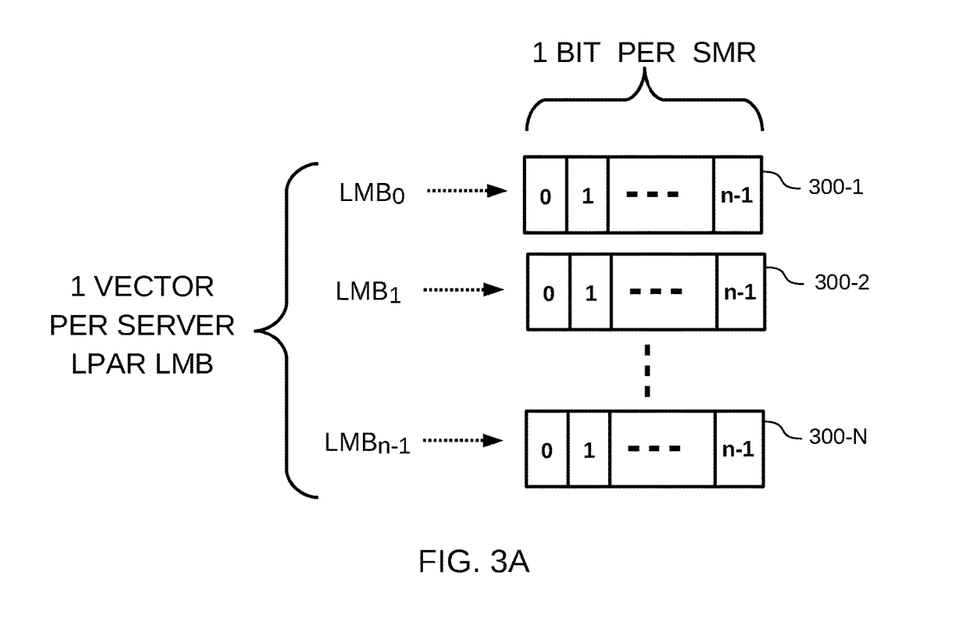
FIG. 3A illustrates an example export vector, according to aspects of the disclosure.
Figure 3B:
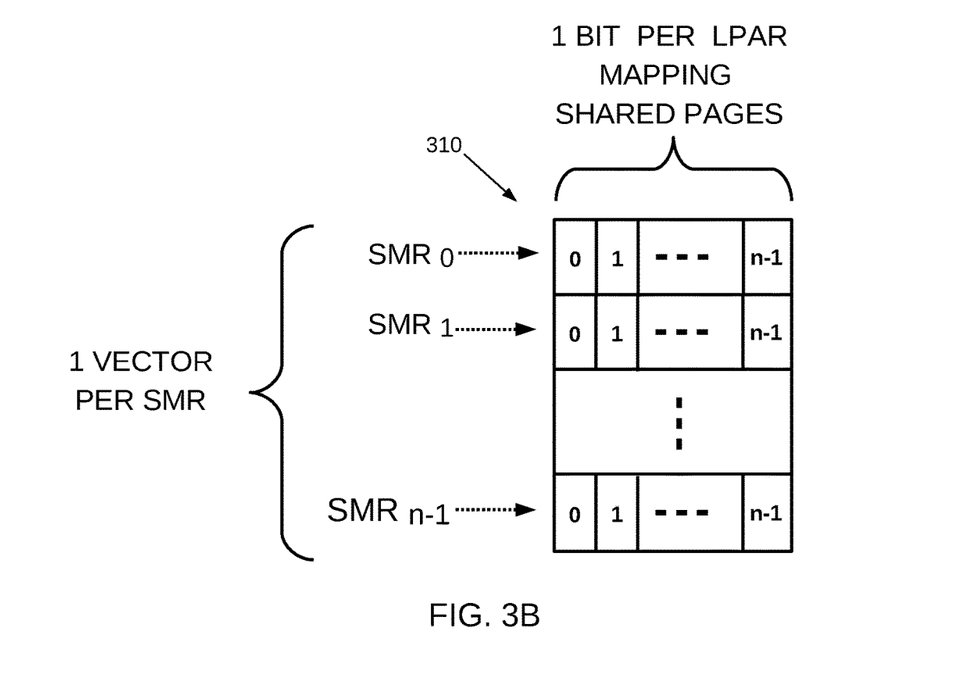
FIG. 3B illustrates an example reference array, according to aspects of the disclosure.

Accordingly, embodiments of the present disclosure can utilize particular structures and/or methods to determine which LMBs include shared memory regions and which LPARs may have an active mapping to those shared pages. FIG. 3A illustrates example export vectors 300-1 . . . 300-N (referred to generically as export vectors 300), which can each comprise a shared access state associating respective LMBs of a server LPAR with SMRs that the server LPAR can map to shared physical pages through logical pages of those LMBs. FIG. 3B further illustrates an example reference array 310, which can comprise a reference state associating an SMR with LPARs that have mapped a shared page of that SMR.

As illustrated in FIG. 3A, export vectors 300 each comprise a sequence of bits in which each bit can correspond to an SMR (e.g., a bit number within an export vector can correlate to an ordinal ID of an SMR) that can be mapped from logical pages of a corresponding LMB. A server LPAR can create an SMR and associate with that SMR logical pages of one or more LMBs allocated to the server LPAR. The server LPAR can map those logical pages (e.g., by means of a page table) to physical pages of an SMR for sharing. A logic value of a bit in an export vector can represent a shared access state of an LMB in association with a particular SMR. For example, bit 0 of export vector 300-1 for $LMB_0$, set to logical '1', can indicate that $SMR_0$ includes at least one logical page of $LMB_0$.

In some embodiments, export vectors 300 can comprise a bit for each SMR that can be defined within the entirety of a virtualized computer (e.g., computer 102 of FIG. 1). In other embodiments, export vectors 300 can comprise a bit for each SMR that can be defined within a server LPAR. An export vector for an LMB can be bounded to a maximum number of SMR entries (e.g., a maximum number of bits) corresponding to, for example, a maximum number of SMRs the virtual computer permits, or a maximum number of SMRs that a server LPAR itself permits.

In some embodiments, a virtualized computer can create an export vector for each LMB that can be defined within the entirety of the virtualized computer. In other embodiments, a virtualized computer can create a set of export vectors for each server LPAR. The set of export vectors can comprise an export vector for each LMB allocated to that server LPAR that has one or more logical pages included in an SMR.

In another embodiment (not illustrated), export vectors 300 can be a table, for example, and can have entries that each comprise the identity of an SMR that includes one or more logical pages of that LMB. A valid SMR identity in an entry for a particular LMB can represent a shared access state of that LMB having one or more logical pages included in the identified SMR. It would be apparent to one of ordinary skill in the art that a variety of data structures can serve to associate an LMB with one or more SMRs that include logical pages of that LMB, to represent a shared access state of that LMB.

FIG. 3B illustrates an example reference array to associate LPARs mapping pages of an SMR with the corresponding SMR(s). Reference array 310 comprises an array of LPAR vectors, having one LPAR vector corresponding to each SMR. An LPAR vector comprises a sequence of bits in which each bit can correspond to an LPAR (e.g., a bit number within an LPAR vector can correlate to an ordinal ID of an LPAR). A logic value of a bit in an LPAR vector can represent a mapping state of the SMR, indicating that the corresponding LPAR has mapped at least one shared page of the corresponding SMR. For example, in reference array 310 bit 0 of the LPAR vector corresponding to $SMR_0$, when set to '1', can be a mapping state of $SMR_0$ indicating that at least one physical page of $SMR_0$ has been mapped from a logical page of an LMB allocated to $LPAR_0$.

In another embodiment (not illustrated), reference array 310 can be a table, for example, and can have entries that each comprise the identity of an SMR and the identities of LPARs that have mapped shared pages within that SMR. An entry having a valid SMR identity can indicate that one or more pages of that SMR has been mapped by at least one client LPAR. A valid identity of an LPAR included in an SMR entry can represent a mapped state of the SMR indicating that that LPAR has mapped at least one logical page to a physical page of that SMR. It would be apparent to one of ordinary skill in the art that a variety of data structures can serve to associate SMRs with one or more LPARs that have mapped shared physical pages from logical pages included in LMBs allocated to those LPARs, and to represent a mapped state of an SMR with respect to particular LPARs.

A virtualized computer can create a single reference array representing all SMRs that can be defined within the entire virtualized computer. Alternatively, a virtualized computer can create a reference array for each server LPAR, representing all SMRs that can be defined within the server LPAR. A reference array can be bounded to a maximum number of LPAR vector entries. The number of bits, for example, in an LPAR vector of a reference array can be bounded to a maximum number of LPARs that are permitted to map an SMR, and the number of LPAR vectors in a reference array can be bounded to, for example, a maximum number of SMRs the virtual computer permits, or a maximum number of SMRs that a server LPAR itself permits.

In embodiments, a hypervisor can create and manage export vectors and/or reference arrays to determine shared access states of particular LMBs and/or mapping states of particular SMRs (e.g., the identities of LPARs that have mapped at least one physical page of an SMR). When it is necessary to invalidate client LPAR mappings to shared physical pages of an SMR, a hypervisor can utilize the export vector and reference array structures to identify LPARs that have mapped logical pages to shared physical pages of various SMRs.

Figure 4:
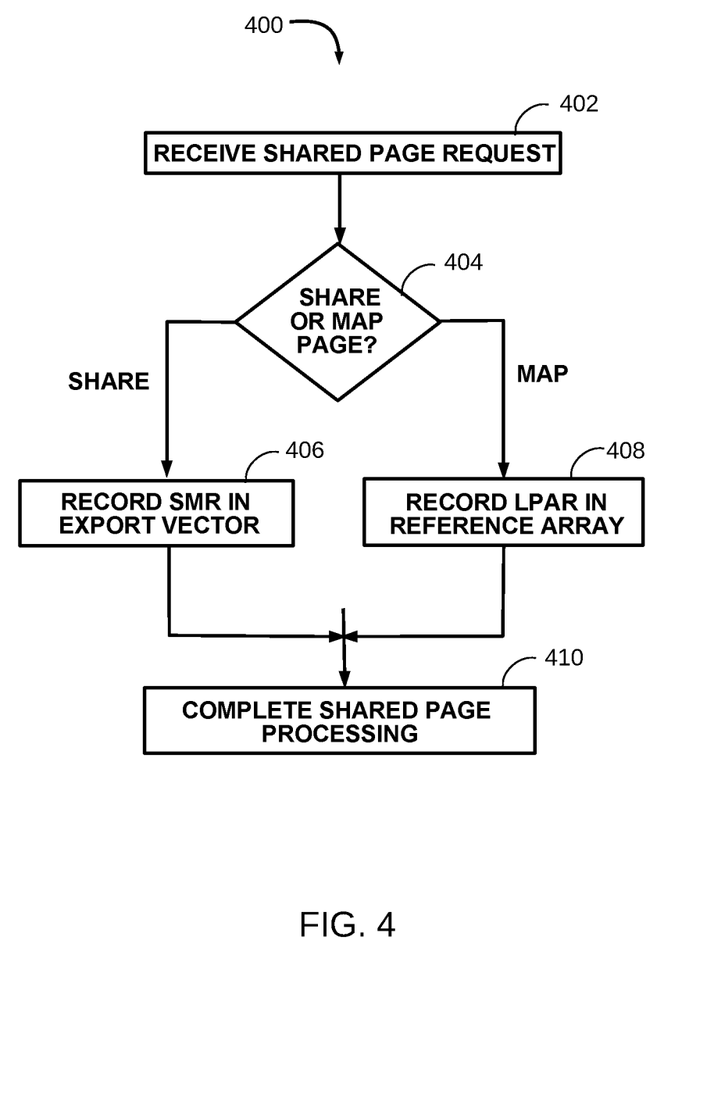
FIG. 4 is a flowchart that illustrates an example method to associate shared memory regions with logical pages, and shared memory regions with logical partitions, according to aspects of the disclosure.

FIG. 4 illustrates an example method, 400, to record a shared access state in an export vector and a mapping state in a reference array. For purposes of illustrating the method, but not limiting to embodiments, the method is described as performed by a hypervisor.

At 402, the hypervisor receives a shared page request to perform a page sharing operation. The request can be, for example, included in a hypervisor interface such as interface 146 of FIG. 1. The request can be included in a function call to a hypervisor (which can be included in a hypervisor interface), or can be associated with, for example, an interrupt or exception event requested from a processor or other programs.

A shared page request can comprise a server LPAR creating a shared memory region and/or associating particular LMBs with an SMR, for example. A request can comprise a server LPAR making particular physical pages of an SMR available for sharing. In another example, a request can comprise a client LPAR operation mapping a client LPAR logical page to a physical page of an SMR. A shared page request can be, for example, in response to a program of an LPAR encountering a page fault referencing a logical page included in an SMR, and the LPAR communicating a logical page identity to the hypervisor to associate with the SMR.

At 404 the hypervisor determines which shared page operation to perform. For purposes of illustrating the method, at 404 the hypervisor determines whether the request indicates a server LPAR operation to share pages or indicates a client LPAR operation to map a physical page of an SMR. If the operation is a server LPAR operation to create an SMR, or to share pages of an SMR, the operation can include the identity of an LMB through which shared pages of the SMR are mapped by the server LPAR. Correspondingly, at 406 the hypervisor records the identity of the SMR in association with the server LPAR LMB. Using the example of FIG. 3A, the hypervisor can make the association, for example, using an export vector.

In embodiments, at 404 if operation includes creating, or registering with the hypervisor, an SMR, the hypervisor can assign an SMR identifier for the SMR. For example, the hypervisor can choose an existing SMR identifier that is not presently in use (e.g., from among a range of pre-defined SMR identifiers) or can generate a new SMR identifier. As part of operation 406, the hypervisor can communicate the SMR identifier to the originator of the request (e.g., a server LPAR).

Alternatively, at 404, the hypervisor can determine that the request indicates a client LPAR operation to map a client LPAR logical page to a physical page within an SMR. The operation can include the identity of the SMR, the identity of the server LMB or server LPAR logical page mapping the shared physical page, and/or the identity of the shared physical page. A hypervisor can use such information to determine which SMR contains the physical page the client LPAR is mapping, and can record the identity of that LPAR in association with the SMR, at block 408. Using the example of FIG. 3B, the hypervisor can record that the client LPAR has mapped at least one page of the server LPAR SMR using a reference array.

At 410, the hypervisor completes processing the shared page operation. In the case that the operation is a server LPAR shared page operation, completing the operation can include, for example, forming an SMR and the hypervisor recording parameters or properties of the SMR, such as the identity of the server LPAR creating the SMR, the server LPAR LMBs that can map the SMR, the physical pages comprising the SMR, and/or particular client LPARs that the server LPAR authorizes to share physical pages of the SMR.

In the case that the operation is a client LPAR mapping operation, the operation can include the identity of a client LPAR logical page to map to the shared physical page, and completing the operation can include, for example, entering the shared page PPN into an HPT that maps client LPAR LPNs.

While the example of FIG. 4 is described in regard to server and client LPAR shared page operations, one of ordinary skill in the art will appreciate that a variety of page sharing operations can initiate associating an SMR with a server LPAR LMB, or associating a client LPAR mapping a shared page with an SMR including that page (e.g., a client LPAR requesting the identity of an SMR). One of ordinary skill in the art will further appreciate that there are a variety of structures other than an export vector and/or a reference array to record the associations, and that programs or components of a virtualized computer other than a hypervisor can perform the example method, or make the associations.

Figure 5:
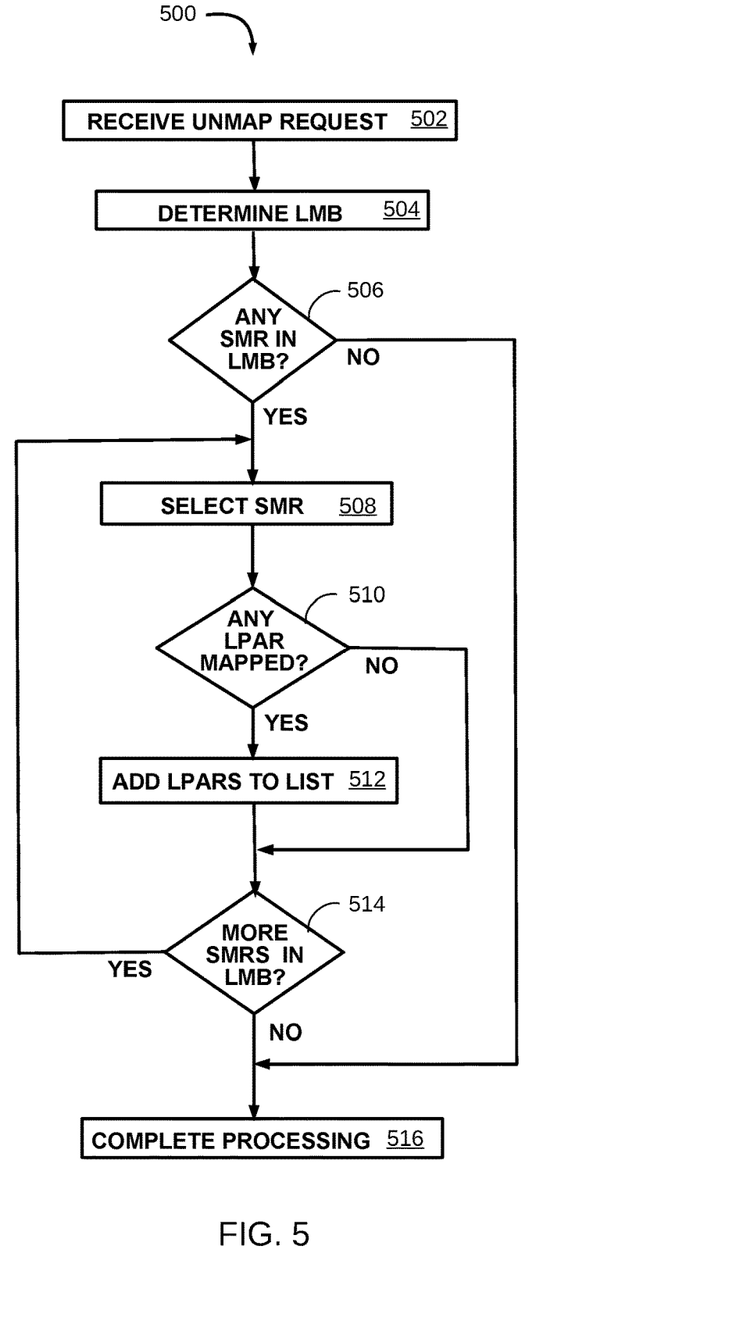
FIG. 5 is a flowchart illustrating a method to determine logical partitions having mapped shared physical pages, according to aspects of the disclosure.

As previously disclosed, certain operations of a virtualized computer, a hypervisor, or server LPARs can require invaliding (i.e., unmapping) one or more client LPAR mappings to all, or to particular, physical pages of an SMR. Accordingly, FIG. 5 illustrates an example method, 500, to determine LPARs that may have active mappings to shared pages of one or more SMRs and which can be used in combination with invalidating such mappings. For purposes of illustrating the method, but not limiting to embodiments, the method is described as performed by a hypervisor.

At 502, the hypervisor receives a mapping request to unmap a physical page and determines that the page is included in an SMR. The request can be, for example, a request included in a hypervisor interface such as interface 146 of FIG. 1. The request can be associated with a variety of events or operations occurring within a virtualized computer, for example: a hypervisor reclaiming a PMB (or, pages thereof); a server LPAR removing authorization of one or more client LPARs to access an SMR, or a shared page thereof; and/or termination of a server LPAR, or a client LPAR. The request can include the identity of a logical page of a server LPAR LMB mapped to a particular physical page of an SMR, the identity of an SMR, and/or the identity of one or more physical pages of an SMR, for example.

At 504 the hypervisor determines the identity of a server LPAR LMB associated with the SMR indicated with the request. The hypervisor can use, for example, the identity of a server LPAR LMB or an SMR, or a PPN, received with the request to determine the identity of a server LPAR LMB. At 506 the hypervisor determines if there are any server LPAR SMRs associated with the server LPAR LMB. The hypervisor can use, for example, an export vector to determine if any SMRs include logical pages of the server LMB. Using the example export vector 300 of FIG. 3A, if any bits of the export vector are logical '1' (e.g., the vector treated as an integer is not integer "zero") than at least one SMR includes one or more logical pages of the associated LMB.

Some embodiments may not include LMBs, or may not include LMBs as described in the examples herein, and a virtualized computer can associate an SMR with one or more server logical pages that are related by a manner other than an LMB. Correspondingly, a hypervisor, at 504, can determine logical pages to associate with an SMR by another means (e.g., a list of logical pages included in an SMR) or identifier (e.g., an identity of a set of related logical pages). At 506, the hypervisor can use such alternative means to identify SMRs associated with particular logical pages (or, vice versa).

If, at 506, the hypervisor determines that the LMB is included in at least one SMR, at 508 the hypervisor selects a first SMR that includes one or more logical pages of the associated LMB (or, other identity of the set of logical pages). At 508, the hypervisor can use, for example, an export vector to select an SMR. Using the example export vector 300 of FIG. 3A, if any bits of the export vector are logical '1' (e.g., the vector treated as an integer is not integer "zero") than at least one SMR includes one or more logical pages of the associated LMB. The hypervisor can, for example, scan from the lowest to the highest ordinal bit to determine an SMR that is mapped from a logical page of the LMB.

At 510, the hypervisor determines if any client (and, optionally, the server) LPAR may have an active mapping to a physical page included in the SMR selected at 508. A hypervisor can use, for example, a reference array, such as the example reference array 310 of FIG. 3B. Using the example reference array 310, if any bits of the LPAR vector, associated with the selected SMR, are logical '1' (e.g., the vector treated as an integer is not integer "zero") than at least one LPAR has mapped, at least at some prior time, one or more of the physical pages included in the associated SMR.

If, at 510, the hypervisor determines that one or more LPARs have mapped a physical page (or, pages) of the selected SMR, at 512 the hypervisor adds the LPARs to a list of LPARs that may have mappings that can require invalidation. A hypervisor, at 512, can use a variety of structures to list, or enumerate, the LPARs. Using the example reference array 310, the hypervisor can, for example, scan from the lowest to the highest ordinal bit (for example) of the LPAR vector associated with the SMR to determine the identities of LPARs that have mapped pages of the SMR, and can add the LPARs, for example, to a list structure (e.g., a linked list), a table structure, or a bit mask. Using the example LPAR vector of reference array 310, a hypervisor can use the LPAR vector itself to enumerate, or otherwise identify, LPARs that have mapped pages of the SMR.

At 514, the hypervisor determines if there are additional SMRs associated with the LMB associated with the request received at 502. If so, at 508 the hypervisor selects a next SMR to process at 510. A hypervisor can select the next SMR in the same manner as used to select the first SMR at 508.

At 516, the hypervisor completes processing the operation indicated by the request received at 502 in response to determining that there are no additional SMRs associated with the LMB associated with the request received at 502. Completing the operation can include processing the LPARs added, at 512, to the list of LPAR that have mapped pages of the SMRs associated with the LMB (or, other related server LPAR logical pages). Processing the list of LPARs can include initiating, or performing, invalidating the mappings, for some or all of the listed LPARs, from the LPAR logical pages to physical pages of the SMR.

In some embodiments, a hypervisor can initiate the process of invalidating the mappings, and can signal the LPARs to perform the invalidation (which, can in turn result in a request to the hypervisor to remove, or invalidate, the mappings in a page table, or HPT). In other embodiments, a hypervisor can both initiate and perform the process of invalidating the mappings. For example, a hypervisor can scan the list of LPARs (e.g., scan an LPAR vector of a reference array) and, for each LPAR (or, for particular LPARs) can inspect (for example) the page table of mappings from the LPAR logical pages to physical pages to determine if the page table includes physical pages of a PMB (or, of an SMR) associated with an operation to unmap pages. A hypervisor can modify a page table entry to remove, or invalidate, the PPN associated with an LPN of an LPAR logical page, for example.

FIG. 5 illustrates an example sequence of operations of method 500. However, operations of method 500 can be performed in differing sequences, or in parallel or concurrently. For example, at 510, an embodiment could, optionally, omit adding (at 512) one or more LPARs to the list and, alternatively, perform operation 518 to complete processing with respect to that or those LPARs. An embodiment can, in another example, perform 514 to process additional SMRs in an LMB while concurrently performing 518. It would be apparent to one of ordinary skill in the art that an embodiment can perform the operations of method 500 in a variety of sequences and/or concurrent operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for managing a shared memory mapping in a computer, the method comprising:
   receiving a first shared page request, wherein the first shared page request is associated with a first logical page included in a first logical memory block (LMB) of a first logical partition (LPAR), wherein the first logical page corresponds to a physical page included in a shared memory region (SMR) associated with the first LPAR;
   determining, in response to the first shared page request, based at least in part on the first logical page corresponding to the physical page, a shared access state associated with the first LMB, wherein the shared access state indicates that the SMR is associated with first LMB,
   wherein the shared access state comprises an export vector corresponding to the first LMB, wherein the export vector comprises a bit corresponding to each SMR in a set of SMRs included in the computer, and wherein a logic value of each bit in the export vector represents that the corresponding SMR is associated with the first LMB;
   receiving a second shared page request, wherein the second shared page request is associated with access to the physical page by a second LPAR included in the computer;
   determining, in response to the second shared page request, a mapping state associated with the SMR;
   receiving a mapping request associated with the physical page;
   determining, in response to the mapping request, based at least in part on the shared access state associated with the first LMB and the mapping state associated with the SMR, that the second LPAR has established a mapping to the physical page; and
   invalidating the mapping to the physical page established by the second LPAR.

2. The method of claim 1, wherein the determining that the second LPAR has established a mapping to the physical page comprises:
   determining that the physical page is associated with the first logical page;
   determining that the first logical page is included in the first LMB;
   determining, based on the shared access state associated with the first LMB, that the first LMB is associated with the SMR; and
   determining, based on the mapping state associated with the SMR, that the second LPAR has established a mapping to the physical page.

3. The method of claim 1, wherein the mapping state comprises a reference array having an entry representing each SMR in a set of SMRs included in the computer, wherein the entry representing each SMR comprises an LPAR bit vector, wherein each LPAR bit vector in the reference array comprises a set of bits, each bit in the LPAR bit vector corresponding to each LPAR in a plurality of LPARs, and wherein a logic value of each bit of the LPAR bit vector represents that the corresponding LPAR has established a mapping to at least one physical page included in the SMR.

4. The method of claim 1, wherein the invalidating the mapping to the physical page established by the second LPAR comprises invalidating the mapping to the physical page in a hardware page table.

5. The method of claim 1, wherein at least one of the first shared page request, the second shared page request, or the mapping request are included in a hypervisor interface.

6. The method of claim 1, wherein the physical page is included in a physical memory block of the computer.

7. A computer program product for managing a shared memory mapping in a computer, wherein the computer program product comprises a computer readable storage medium having program instructions embodied thereon, and wherein the program instructions are executable by a processor to perform a method comprising:
   receiving a first shared page request, wherein the first shared page request is associated with a first logical page included in a first logical memory block (LMB) of a first logical partition (LPAR), wherein the first logical page corresponds to a physical page included in a shared memory region (SMR) associated with the first LPAR;
   determining, in response to the first shared page request, based at least in part on the first logical page corresponding to the physical page, a shared access state associated with the first LMB, wherein the shared access state indicates that the SMR is associated with first LMB,
   wherein the shared access state comprises an export vector corresponding to the first LMB, wherein the export vector comprises a bit corresponding to each SMR in a set of SMRs included in the computer, and wherein a logic value of each bit in the export vector represents that the corresponding SMR is associated with the first LMB;
   receiving a second shared page request, wherein the second shared page request is associated with access to the physical page by a second LPAR included in the computer;
   determining, in response to the second shared page request, a mapping state associated with the SMR;
   receiving a mapping request associated with the physical page;
   determining, in response to the mapping request, based at least in part on the shared access state associated with the first LMB and the mapping state associated with the SMR, that the second LPAR has established a mapping to the physical page; and invalidating the mapping to the physical page established by the second LPAR.

8. The computer program product of claim 7, wherein the determining that the second LPAR has established a mapping to the physical page comprises:
determining that the physical page is associated with the first logical page;
determining that the first logical page is included in the first LMB;
determining, based on the shared access state associated with the first LMB, that the first LMB is associated with the SMR; and
determining, based on the mapping state associated with the SMR, that the second LPAR has established a mapping to the physical page.

9. The computer program product of claim 7, wherein the mapping state comprises a reference array having an entry representing each SMR in a set of SMRs included in the computer, wherein the entry representing each SMR comprises an LPAR bit vector, wherein each LPAR bit vector in the reference array comprises a set of bits, each bit in the LPAR bit vector corresponding to each LPAR in a plurality of LPARs, and wherein a logic value of each bit of the LPAR bit vector represents that the corresponding LPAR has established a mapping to at least one physical page included in the SMR.

10. The computer program product of claim 7, wherein the invalidating the mapping to the physical page established by the second LPAR comprises invalidating the mapping to the physical page in a hardware page table.

11. The computer program product of claim 7, wherein at least one of the first shared page request, the second shared page request, or the mapping request are included in a hypervisor interface.

12. The computer program product of claim 7, wherein the physical page is included in a physical memory block of the computer.

13. A system for managing a shared memory mapping in a computer having a plurality of logical partitions (LPARs), the system comprising:
a first LPAR included in the plurality of LPARs;
a shared memory region (SMR) associated with the first LPAR;
a processor, wherein the processor is configured to execute a hypervisor program, and wherein the hypervisor program is configured to cause the processor to perform a method comprising:
receiving a first shared page request, wherein the first shared page request is associated with a first logical page included in a first logical memory block (LMB) of the first LPAR, wherein the first logical page corresponds to a physical page included in the SMR;
determining, in response to the first shared page request, based at least in part on the first logical page corresponding to the physical page, a shared access state associated with the first LMB, wherein the shared access state indicates that the SMR is associated with first LMB,
wherein the shared access state comprises an export vector corresponding to the first LMB, wherein the export vector comprises a bit corresponding to each SMR in a set of SMRs included in the computer, and wherein a logic value of each bit in the export vector represents that the corresponding SMR is associated with the first LMB;
receiving a second shared page request, wherein the second shared page request is associated with access to the physical page by a second LPAR included in the computer;
determining, in response to the second shared page request, a mapping state associated with the SMR;
receiving a mapping request associated with the physical page;
determining, in response to the mapping request, based at least in part on the shared access state associated with the first LMB and the mapping state associated with the SMR, that the second LPAR has established a mapping to the physical page; and
invalidating the mapping to the physical page established by the second LPAR.

14. The system of claim 13, wherein the determining that the second LPAR has established a mapping to the physical page comprises:
determining that the physical page is associated with the first logical page;
determining that the first logical page is included in the first LMB;
determining, based on the shared access state associated with the first LMB, that the first LMB is associated with the SMR; and
determining, based on the mapping state associated with the SMR, that the second LPAR has established a mapping to the physical page.

15. The system of claim 13, wherein the mapping state comprises a reference array having an entry representing each SMR in a set of SMRs included in the computer, wherein the entry representing each SMR comprises an LPAR bit vector, wherein each LPAR bit vector in the reference array comprises a set of bits, each bit in the LPAR bit vector corresponding to each LPAR in the plurality of LPARs, and wherein a logic value of each bit of the LPAR bit vector represents that the corresponding LPAR has established a mapping to at least one physical page included in the SMR.

16. The system of claim 13, wherein the invalidating the mapping to the physical page established by the second LPAR comprises invalidating the mapping to the physical page in a hardware page table.

17. The system of claim 13, wherein at least one of the first shared page request, the second shared page request, or the mapping request are included in a programming interface of the hypervisor program.

* * * * *